United States Patent
Ryan et al.

[11] Patent Number: 6,039,346
[45] Date of Patent: Mar. 21, 2000

[54] AIR BAG MODULE WITH VARIABLE INFLATION

[75] Inventors: Shawn Gregory Ryan, Dayton; James Lloyd Webber, Centerville, both of Ohio; Joachim Borowski, Remscheid, Germany

[73] Assignee: General Motors Corporation, Detroit, Mich.

[21] Appl. No.: 08/785,562

[22] Filed: Jan. 17, 1997

[51] Int. Cl.[7] .................................................. B60R 21/26
[52] U.S. Cl. .......................................... 280/736; 280/739
[58] Field of Search .................................. 280/739, 736, 280/738, 742, 735

[56] References Cited

U.S. PATENT DOCUMENTS

| | | | |
|---|---|---|---|
| 3,861,712 | 1/1975 | Matsui et al. | 280/739 |
| 5,221,109 | 6/1993 | Marchant | 280/736 |
| 5,366,242 | 11/1994 | Faigle et al. | 280/739 |
| 5,664,802 | 9/1997 | Harris et al. | 280/736 |
| 5,695,214 | 12/1997 | Faigle et al. | 280/735 |
| 5,707,078 | 1/1998 | Swanberg et al. | 280/739 |
| 5,709,405 | 1/1998 | Saderholm et al. | 280/739 |

FOREIGN PATENT DOCUMENTS

| | | |
|---|---|---|
| 0 800 967 | 10/1997 | European Pat. Off. . |
| 19704501A1 | 8/1997 | Germany . |
| 3-32957 | 2/1991 | Japan ................................. 280/739 |

*Primary Examiner*—Peter C. English
*Attorney, Agent, or Firm*—Kathryn A Marra

[57] ABSTRACT

An air bag module includes an air bag and an inflator being activatable to discharge inflator gas for inflating the air bag. The inflator has at least one discharge port through which inflator gas is discharged. A housing has a wall adjacent the discharge port of the inflator and includes at least one vent opening. The module also includes a movable member alignable with the vent opening. The movable member is movable relative to the vent opening for opening and closing the vent opening at a predetermined time during inflator activation to control the amount of inflator gas discharged into the air bag and the amount of inflator gas expelled out through the vent opening of the housing. A device is activatable during activation of the inflator to move the movable member relative to the vent opening at the predetermined time during inflator activation.

2 Claims, 7 Drawing Sheets

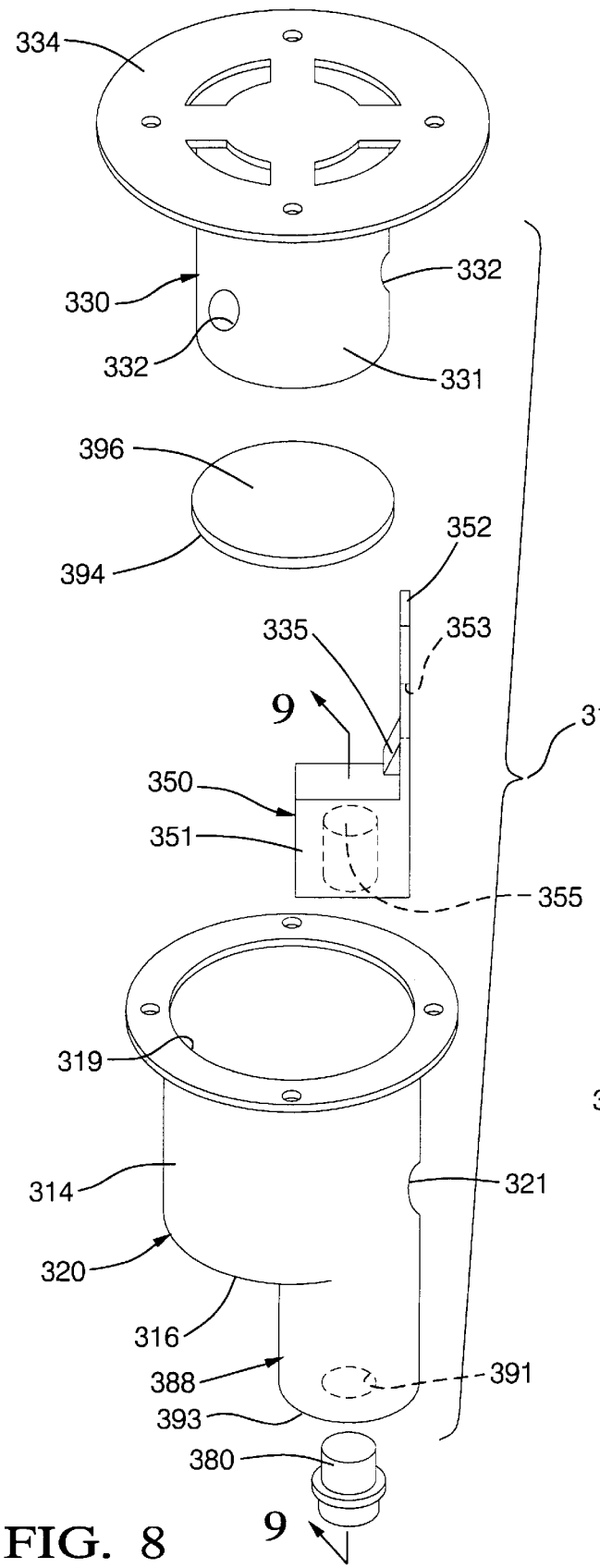
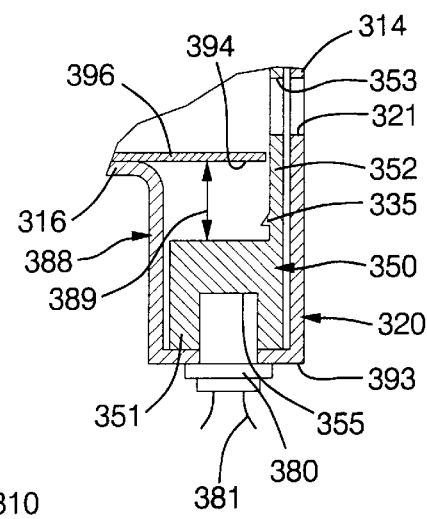
FIG. 9
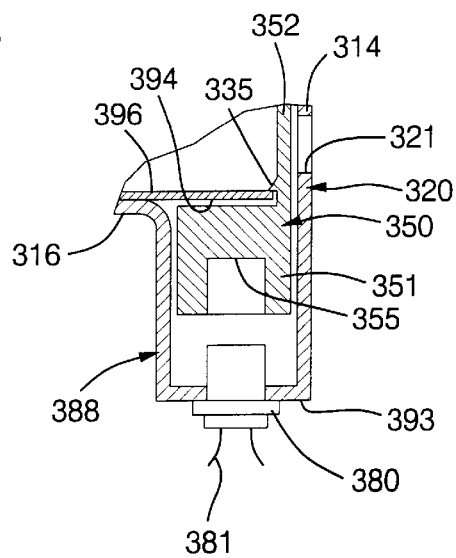
FIG. 10
FIG. 8

AIR BAG MODULE WITH VARIABLE INFLATION

TECHNICAL FIELD

This invention relates to an air bag module capable of variable air bag inflation.

BACKGROUND OF THE INVENTION

It is well known in the prior art to provide an air bag module which includes an inflatable air bag for protection of a vehicle occupant. The air bag module typically includes an inflator for discharging inflator gas to inflate the air bag. Upon sensing certain predetermined vehicle conditions, such as a certain amount of vehicle deceleration, the inflator discharges a fixed amount of inflator gas and the air bag is deployed.

In some cases, it may be desirable to provide an inflator that has varied levels or stages of inflator gas output in response to the sensing of different vehicle or occupant conditions. Thus, it is also known in the prior art to provide a dual-stage inflator that can discharge predetermined amounts of gas at one or two levels. However, these dual-stage inflators are more complex than typical inflators and have the limitation of typically providing only two different levels of gas output. An inflator that discharges inflator gas at a wide range of levels is not readily available. Even if available, dual-stage or multi-stage inflators are complex to manufacture and add mass to the air bag module.

It has also been suggested in the prior art to provide an air bag module including a reaction canister which houses the inflator and air bag and which includes a valve member which is continually repositioned for opening, closing, or partially opening the vent openings on the reaction canister primarily in response to changes in ambient temperature by the use of a bimetallic spring, servo motor or solenoid valve. Thus, the amount of the discharging inflator gas expelled from the housing is controlled solely by the exact position of the valve member which must be carefully positioned for providing partial opening of the vent openings. In addition, the prior art teaches that the position of the valve member and the amount of venting is continually adjusted during vehicle use prior to activation of the inflator rather than only specifically at the time of air bag deployment. In addition, the use of a bimetallic spring, servomotor or solenoid takes time to move the valve member between the various positions and thus is continually being adjusted prior to activation of the inflator. This arrangement is also complex and adds mass to the module.

SUMMARY OF THE INVENTION

This invention provides advantages and alternatives over the prior art by providing an air bag module that provides a wide range of levels of inflator gas into the air bag. This can be accomplished with an inflator having a single output level for discharging inflator gas. Advantageously, this invention provides a device which can be activated nearly instantaneously to vary the amount of venting for the module and thus the level of inflator gas discharged into the air bag based upon occupant and vehicle conditions. Thus, the device need only be activated under circumstances in which the inflator is activated and not on a continual basis prior to inflator activation. Preferably, the level of inflator gas discharged into the air bag is varied based on the exact time that a vent opening in the housing is either opened or closed during inflator activation. Advantageously, the device may be expendable since it is only used once, if at all, during inflator activation.

These advantages are accomplished in the present invention by providing an air bag module for restraint of an occupant in a vehicle. The air bag module includes an air bag and an inflator being activatable to discharge inflator gas for inflating the air bag. The inflator has at least one discharge port through which inflator gas is discharged. A housing has a wall adjacent the discharge port of the inflator and includes at least one vent opening. The module also includes a movable member alignable with the vent opening. The movable member is movable relative to the vent opening for opening and closing the vent opening at a predetermined time during inflator activation to control the amount of inflator gas discharged into the air bag and the amount of inflator gas expelled out through the vent opening of the housing. A device is activatable during activation of the inflator to move the movable member relative to the vent opening at the predetermined time during inflator activation.

Preferably, the vent opening on the housing and the discharge port on the inflator are substantially aligned with each other such that substantially all of the inflator gas discharged from the discharge port is expelled out through the vent opening when the movable member is positioned for opening the vent opening. Also preferably, the device is an expendable, pyrotechnic device which generates pressure for moving the movable member. The pyrotechnic device is fired during activation of the inflator to move the movable member relative to the vent opening at the predetermined time to control the amount of inflator gas discharged into the air bag. Preferably, the predetermined time for moving the movable member is determined in response to predetermined conditions of the occupant and vehicle.

The movable member may be normally positioned in a first position for closing the vent opening such that a full amount of inflator gas is normally discharged into the air bag and the movable member is movable to a second position for opening the vent opening at a predetermined time after activation of the inflator to decrease the amount of inflator gas discharged into the air bag. Alternately, the movable member may be normally positioned in a first position for opening the vent opening such that at least a portion of the inflator gas is normally expelled out through the vent opening and the movable member is movable to a second position for closing the vent opening at a predetermined time during activation of the inflator to increase the amount of inflator gas discharged into the air bag. Preferably, the vent opening is either entirely open or entirely closed when the movable member is in the first or second positions.

In one preferred version of the invention, the movable member has a generally plate-like shape and the module includes a pin for holding the movable member in a first position. The activation of the device forces the movable member from the first position to a second position and the pin is broken when the movable member is in the second position. Alternately, the movable member is a rotatable ring and the ring is rotated relative to the inflator and housing upon activation of the device. The module preferably includes a stop surface which limits movement of the movable member upon activation of the device and properly positions the movable member relative to the vent opening. The housing may also include an interior pocket portion in which the movable member is seated. Preferably, the pocket portion includes a pocket aperture through which the device is insertable into the movable member after insertion of the movable member into the housing.

Thus, it will be appreciated that variable levels of inflation of the air bag can be achieved using a single inflator having only a single level of gas output in combination with at least one vent opening that is preferably either entirely opened or entirely closed at a predetermined time during discharge of inflator gas by a movable member in response to activation of the pyrotechnic device. Almost instantaneous control of the movable member is enabled by the use of the device that reacts nearly instantaneously to the signal received from the vehicle sensors. It will also be appreciated that this system provides a relatively simple, cost effective and lightweight solution to providing variable levels of air bag inflation from a single level inflator.

BRIEF DESCRIPTION OF THE DRAWINGS

The present invention will now be described, by way of example, with reference to the accompanying drawings, in which:

FIG. 8 is an exploded perspective view of yet another alternate embodiment of the invention showing a driver's side module with a housing having a pocket portion and a movable member which moves in a vertical direction and a vent opening which is initially open;

FIG. 9 is an assembled cross-sectional view of the module of FIG. 8 taken generally along line 9—9 of FIG. 8 and showing the movable member in a first position in which the vent opening is open;

FIG. 10 is a cross-sectional view similar to FIG. 9 and showing the movable member moved to a second position such that the vent opening is closed;

DESCRIPTION OF THE PREFERRED EMBODIMENT

Figures 1, 2:
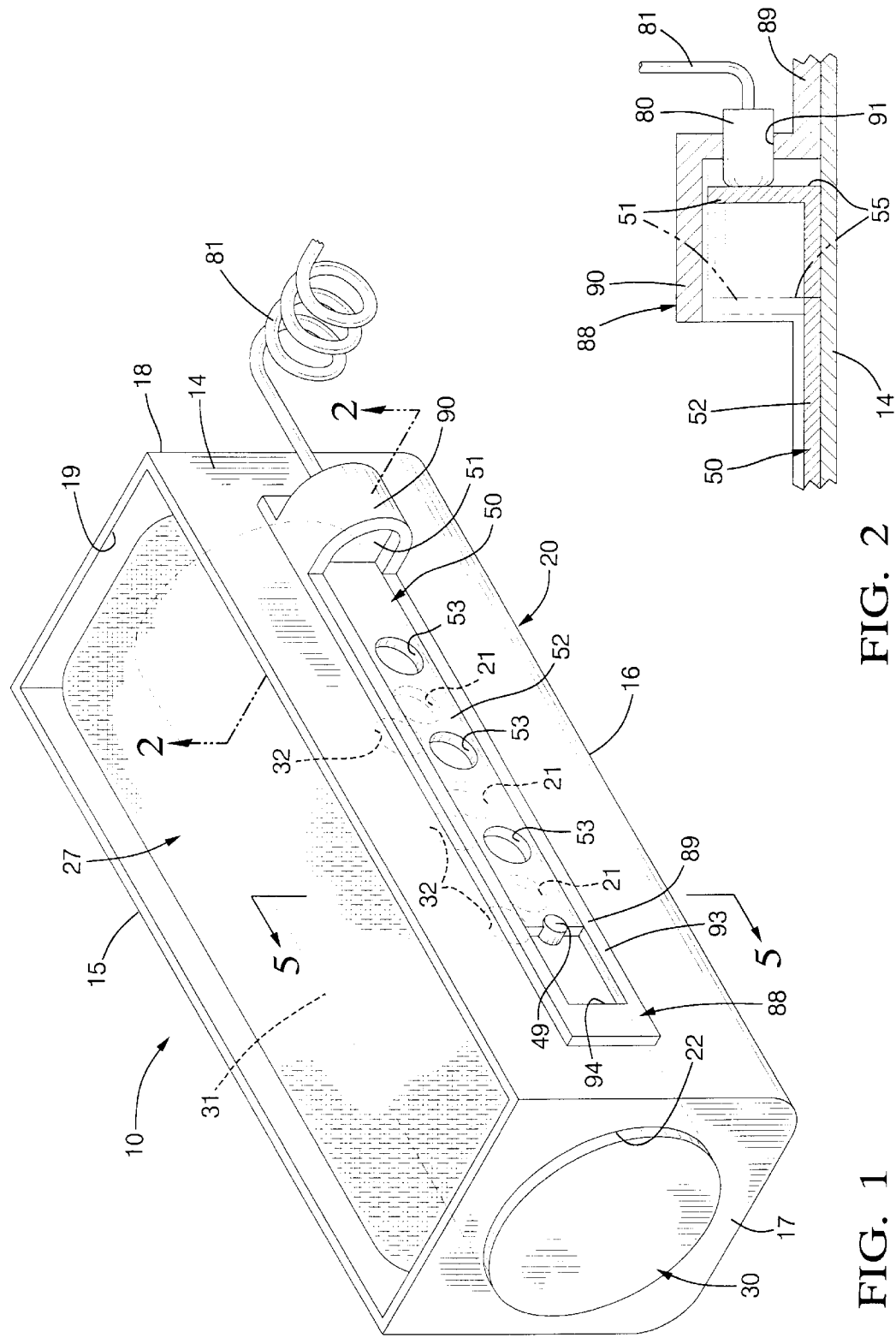
FIG. 1 is a perspective view showing a passenger side air bag module including a movable member and with vent openings in the housing being initially closed.
FIG. 2 is a sectional view taken along line 2—2 of FIG. 1 and showing the movable member in a first position in solid lines and in a second position in phantom lines.

Referring to FIG. 1, an air bag module 10 is mounted in a vehicle (not shown) for protection of a vehicle occupant (not shown). The module 10 includes a housing 20, an inflatable air bag 27, and an inflator 30 for generating gas to inflate the air bag 27. The module 10 is typically mounted on the passenger side of the vehicle, but could also be mounted in other locations on the vehicle. The module 10 is secured to the vehicle in any suitable manner. The module 10 further includes a movable member 50 and a pyrotechnic device 80 used to vary the amount of inflator gas discharged into the air bag 27, as described in detail hereinafter.

The housing 20 includes opposing side walls 14, 15 joined by a bottom wall 16 and opposing end walls 17, 18. The end wall 17 includes an end opening 22 for receiving the inflator 30 therein. The side walls 14, 15 and end walls 17, 18 cooperatively define a housing opening 19 through which the air bag 27 is deployed. The side walls 14, 15 of the housing 20 are positioned adjacent the discharge ports of the inflator 30. The housing 20 further includes a plurality of vent openings 21 in the side wall 14. The vent openings 21 are preferably generally aligned with respective discharge ports 32 in the inflator 30, as described further hereinafter.

As best shown in FIG. 1, the inflator 30 may be of any conventional construction for generating inflator gas to inflate the air bag 27. Advantageously, the inflator 30 is preferably a single stage inflator 30 which outputs inflator gas at a single level for inflating the air bag 27. The inflator 30 has a generally cylindrical body portion 31 and is insertable through the end opening 22 in the end wall 17 for insertion within the housing 20. The inflator 30 has ends which are suitably secured to the housing 20. The inflator 30 also includes a plurality of discharge ports 32 which are preferably positioned adjacent the side walls 14, 15 of the housing 20 on opposing sides of the inflator 30 for thrust neutral discharge. Preferably, certain of the discharge ports 32 are generally aligned with the corresponding vent openings 21 in the housing 20.

The air bag 27 may be of any conventional construction for inflating upon the discharge of inflator gas. Referring to FIG. 1, the air bag 27 is shown in the folded condition stored atop the inflator 30 prior to inflator activation. Upon activation of the inflator 30, the air bag 27 is filled with a predetermined amount of inflator gas during inflator activation and deploys out through the housing opening 19 for protection of the vehicle occupant.

As best shown in FIG. 1, a support member 88 is disposed on the side wall 14 of the housing 20 for holding the movable member 50 and the pyrotechnic device 80. The support member 88 may be attached to, such as by welding, or integrally formed with the housing 20. The support member 88 includes a frame portion 89 in which the movable member 50 is slidably received. The frame portion 89 has wall portions 93 for capturing the movable member 50 therein and includes a stop surface 94 against which the movable member 50 is stopped and positioned relative to the vent openings 21 upon firing of the pyrotechnic device 80. Referring to FIGS. 1 and 2, the support member 88 further includes an outwardly protruding bracket portion 90 including a support aperture 91 through which the pyrotechnic device 80 is inserted and held in position relative to the movable member 50.

The movable member 50 is slidably mounted on the support member 88. The movable member 50 has a generally plate-like shape and is alignable with the vent openings 21. The movable member 50 is movable relative to the vent openings 21 for opening and closing the vent openings 21 at a predetermined time to control the amount of inflator gas discharged into the air bag 27 and the amount of inflator gas expelled out through the vent openings 21 of the housing 20. The movable member 50 has a generally planar outwardly extending portion 52 positioned adjacent the vent openings 21 and a reaction portion 51 which is bent at approximately 90 degrees relative to the outwardly extending portion 52. As best shown in FIG. 2, the reaction portion 51 includes a reaction surface 55 facing the pyrotechnic device 80. The outwardly extending portion 52 includes a plurality of apertures 53 which are alignable with the vent openings 21. Preferably the vent openings 21 and the apertures 53 are approximately the same size.

A pin 49 is disposed on the housing 20 and holds the movable member 50 in a first initial position within the frame portion 89 of the support member 88. It will be appreciated that in the first position, the apertures 53 in the movable member 50 are not aligned with the vent openings 21 on the housing 20 such that the vent openings 21 are preferably entirely closed prior to activation of the inflator 30 as best shown in FIG. 1. Upon activation of the pyrotechnic device 80, the movable member 50 is movable to a second position in which the apertures 53 on the movable member 50 are aligned with the vent openings 21 on the housing 20. Thus, when the movable member 50 is in the second position, the vent openings 21 are entirely open.

The pyrotechnic device 80 or squib preferably contains a chemical which is ignited upon receiving a signal from vehicle sensors (not shown). A wire 81 transmits a signal from the sensors to the pyrotechnic device 80 to activate the device 80. Upon activation, the device 80 produces a pressure wave that presses against the reaction surface 55 of the movable member 50 and quickly forces the movable member 50 from the first position to the second position. Advantageously, the pyrotechnic device 80 produces a pressure wave almost instantaneously and preferably within less than 1 ms after activation. Thus, upon firing of the pyrotechnic device 80 the movable member 50 is moved from the first position in which the vent openings 21 are entirely closed to the second position in which the vent openings 21 are entirely open almost instantaneously. Accordingly, it follows that the movable member 50 may be movable from a first position to a second position within about 1 ms or less after activation of the device 80.

Prior to activation of the inflator 30, the air bag 27 is stored in a folded condition atop the inflator 30. Also prior to activation of the inflator 30, the movable member 50 is held within the support member 88 in the first position by the pin 49 with the apertures 53 misaligned with the vent openings 21 such that the vent openings 21 are closed. Upon sensing certain predetermined vehicle and occupant conditions, the sensors send a signal to the pyrotechnic device 80 advising the device 80 whether the movable member 50 should be opened at a predetermined time during activation of the inflator 30 so that a certain amount of inflator gas is expelled out through the vent openings 21. Referring to FIG. 2, if the device 80 is fired, the pressure wave or flame expelled by the pyrotechnic device 80 reacts against the reaction surface 55 of the movable member 50 and instantaneously shoots the movable member 50 into the second position. The movable member 50 shears off the pin 49 and is nearly instantaneously shifted from the first position to the second position. When the movable member 50 is moved to the second position, the apertures 53 are aligned with the vent openings 21 such that the vent openings 21 are entirely open and inflator gas is expelled out through the vent openings 21.

The amount of inflator gas discharged into the air bag 27 is variable to a wide range of levels, even with the use of the single stage inflator 30, as will now be described. Upon the sensing of predetermined vehicle conditions by sensors (not shown), the inflator 30 is activated and receives the signal to begin the process of discharging inflator gas at a time which will be designated as 0 milliseconds. It is noted that after the inflator 30 is activated, it may take an additional few milliseconds before the inflator gas actually begins to be discharged into the air bag 27. It will also be appreciated that the inflator gas is discharged over a brief known period of total time for a given inflator 30 after activation. For example, after activation at 0 milliseconds, inflator gas may be discharged until a total time of 60 milliseconds after activation. Of course, the amount of time that gas is discharged depends on the type of inflator 30 and is in no way limited to the example of 60 milliseconds. Advantageously, the use of a pyrotechnic device 80 enables the vent openings 21 to be opened or closed almost instantaneously upon firing of the device 80. Thus, the amount of inflator gas discharged into the air bag 27 is easily varied by moving the movable member 50 at a specific predetermined time as enabled by firing the device 80.

The predetermined time for moving the movable member 50 is determined in response to predetermined conditions of the occupant and vehicle which are sensed by one or more sensors and relayed to the device. The predetermined conditions preferably include the mass of the occupant, the position of the occupant, the seat belt usage of the occupant, and the amount and direction of vehicle deceleration. For a given set of predetermined conditions at the time of inflator activation, a signal is sent to the device 80 which tells the device 80 the predetermined time at which it should fire and move the movable member 50 from the first position to the second position for those particular set of conditions. For example, the device 80 can be fired for moving the movable member 50 at a time of 10 ms into inflator activation or 20 ms into inflator activation or at any other time during inflator activation.

Figures 5, 6:
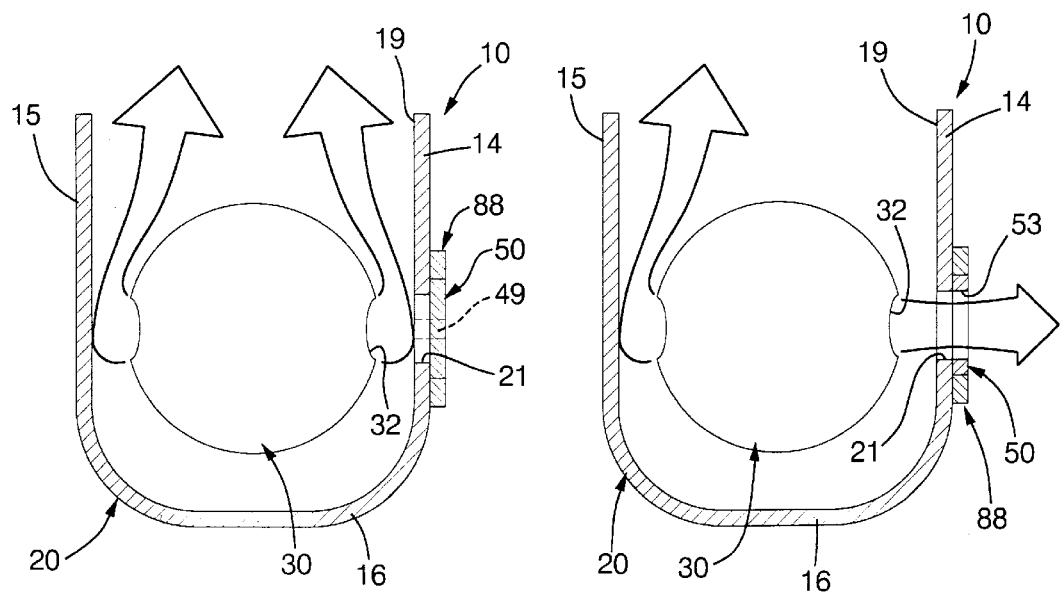
FIG. 5 is a cross-sectional view taken along line 5—5 of FIG. 1 and showing the movable member positioned for closing the vent openings in the housing with arrows indicating the flow of inflator gas.
FIG. 6 is a view similar to FIG. 5, but showing the movable member positioned for opening the vent opening with arrows indicating the flow of inflator gas.

As a result, the amount of inflator gas discharged into the air bag 27 can be varied to a wide variety of levels to accommodate numerous conditions with a single inflator 30. This can be demonstrated with reference to FIGS. 5 and 6. As best shown in FIG. 5, when the movable member 50 is in the first position and the vent openings 21 are entirely closed, the full amount of inflator gas is delivered into the air bag 27 as shown by the arrows in an upwardly direction towards the air bag 27. FIG. 6 shows the movable member 50 moved to the second position in which the apertures 53 are aligned with the vent openings 21 such that the vent openings 21 are entirely open. When the movable member 50 is in the second position, the discharge ports 32 on one side of the inflator 30 are aligned with the apertures 53 and vent openings 21 such that about half of the discharging inflator gas is expelled directly out through the vent openings 21 as indicated by the arrow extending out through the vent openings 21. The other half of the inflator gas is delivered into the air bag 27 for air bag inflation as indicated by the upwardly directed arrow.

Thus, if the device 80 is not fired, then the movable member 50 remains in the first position and the vent openings 21 are closed during the entire time of inflator gas discharge. The full amount of inflator gas is then used to fill the air bag 27. Alternately, the device 80 may be fired at the same time as inflator activation (time=0 ms) such that a predetermined maximum amount of inflator gas is expelled out through the vent openings 21 and the least amount of gas is used to fill the air bag 27. Thus, for each module 10, a predetermined maximum amount of venting can be defined which is the maximum amount of venting that will occur if the vent openings 21 are continuously open during the entire time of inflator gas discharge. In other words, the device 80 is fired and the movable member is moved to the second position at about 0 ms. The maximum amount of venting for each module 10 is set to a predetermined percentage by the size and number of the vent openings 21 on the housing 10.

Most preferably, the vent openings 21 are substantially aligned with the discharge ports 32 on the inflator 30 such that substantially all of the inflator gas discharged from the discharge ports 32 is expelled out through the corresponding aligned vent openings 21. Advantageously, this allows the maximum amount of venting to be achieved with the smallest and least amount of vent openings 21 possible. This may be desirable since the vent openings 21 can affect the ride down characteristics of the air bag 27 after it is inflated. If the vent openings 21 are the smallest possible for the maximum amount of venting, then deflation of the air bag 27 upon occupant interaction is the least affected. Occupant ride down can be controlled in other manners, such as vents on the air bag 27. Alternately, the vent openings 21 can also be tuned to a size that is desirable for occupant ride down as well as maximum venting.

Figure 11:
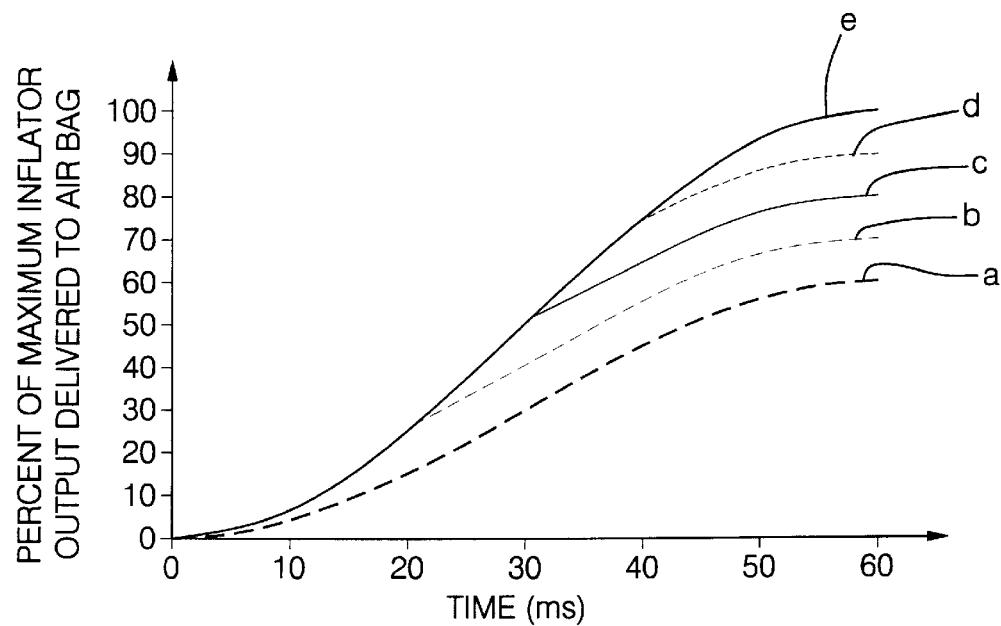
FIG. 11 is an exemplary graph depicting percent of maximum inflator output delivered to the air bag versus time for the case in which the vent opening is normally closed.

After determining the maximum percent of venting for the module by size and placement of the vent openings 21, any variation between the maximum amount of venting and the minimum amount of venting (typically zero venting) can be achieved by moving the movable member 50 at a predetermined time during inflator 30 activation. This can be further understood with reference to FIG. 11. FIG. 11 shows the generic inflation curves for a module 10 having about 40% maximum venting. However, the general shape of the curves will be the same for any amount of maximum venting. The curves represent the percent of maximum inflator output delivered to the air bag versus time that the inflator actually discharges gas in milliseconds for a generic module in which the vent openings 21 are normally closed when the movable member 50 is in the first position.

For example, curve e represents when the movable member 50 remains in the first position during the entire inflator activation. Curve e shows that when the vent openings 21 are not opened at all such that there is zero venting, then 100% of inflator output is delivered to the air bag 27. At the other end of the range, curve a shows the situation in which the movable member 50 is moved to the second position during the entire inflator activation. Curve a shows that when the vent openings 21 are opened at 0 ms or approximately at the same moment that the inflator 30 is activated, then only 60% of the inflator gas output is delivered to the air bag 27 for inflation and 40% or the maximum amount is expelled out through the vent openings 21 in the housing 20. It will be appreciated that the 40% maximum venting was a predetermined amount based on the size and location of the vent openings 21 and can be varied. Curve b depicts that when the movable member 50 is moved to the second position at the predetermined time of 20 ms into inflator 30 activation, then about 70% of the inflator gas output is delivered into the air bag 27 and 30% of the inflator gas is expelled out through the vent openings 21. Curve c represents the scenario in which the movable member 50 is moved to the second position at the predetermined time of 30 ms into inflator 30 activation such that about 80% of the inflator gas output is delivered into the air bag 27 and 20% of the inflator gas is expelled out through the vent openings 21. Finally, curve d represents the scenario in which the movable member 50 is moved to the second position at the predetermined time of 40 ms into inflator 30 activation such that about 90% of the inflator gas output is delivered into the air bag 27 and about 10% of the inflator gas is expelled out through the vent openings 21. It will be appreciated that the curves are merely exemplary and that many other inflation variations are possible depending on the maximum amount of venting and the time at which the device 80 is fired to move the movable member 50. It will be appreciated that the venting could be varied from 0% to 100% with the appropriate number of vent openings 21.

Thus, it will be appreciated that variable levels of inflation of the air bag 27 can be achieved using a single inflator 30 having only a single level of gas output in combination with vent openings 21 that are preferably either entirely open or entirely closed at a predetermined time during discharge of inflator gas by a movable member 50 in response to activation of a pyrotechnic device 80. Almost instantaneous control of the movable member 50 is enabled by the use of the device 80 that reacts nearly instantaneously to the signal received from the vehicle sensors. The pyrotechnic device 80 is expendable since it only need be used once, if at all during the lifetime of the inflator 30. The pyrotechnic device 80 has been advantageously used to produce mechanical movement, instead of as a typical igniter. It will be appreciated that the movable member 50 need only be moved once during the lifetime of the module 10, if at all, and thus the use of an expendable device 80 is possible. It will also be appreciated that this system provides a relatively simple, cost effective and lightweight solution to providing variable levels of air bag 27 inflation from a single level inflator 30. Advantageously, the present invention is easily adaptable to the structure of existing air bag modules, although the additional vehicle sensors would still be needed for sensing the vehicle and occupant conditions. Also advantageously, this invention uses expendable parts, which are only moved once, if at all, such that reliability over numerous cycles of movement is not a concern. Furthermore, the vent openings 21 are either entirely open or entirely closed such that the movable member 50 can be quickly fired open. There is no careful movement of the movable member 50 which is needed for partially opening or partially closing the vent openings 21.

It will be understood that a person skilled in the art may make modifications to the preferred embodiment shown herein within the scope and spirit of the claims. For example, although the inflator 30 is preferably a single stage inflator, it is not limited to use with a single stage inflator. The invention could also be used with a dual-stage or multi-stage inflator if desired, but is not necessary to provide variable inflation at nearly any level. Although only one movable member 50, one set of vent openings 21, and one device 80 are shown it will be appreciated that there could be additional devices 80, vent openings 21 and movable members 50 on a given module 10. It will further be appreciated that there need only be at least one vent opening 21 on the housing 20 and that the movable member 50 need not necessarily include apertures 53 since the movable member 50 can simply be moved relative to the vent openings 21 for opening and closing the vent openings 21.

Although the embodiment shows the movable member 50 closing the vent openings 21 in the first position prior to inflator activation and opening the vent openings 21 at a predetermined time when moved to the second position upon activation of the device 80, it will be appreciated that the movable member 50 may alternately open the vent openings 21 in the first position prior to inflator activation and close the vent openings 21 at a predetermined time during inflator activation when moved to the second position upon firing of the device 80.

Figure 12:
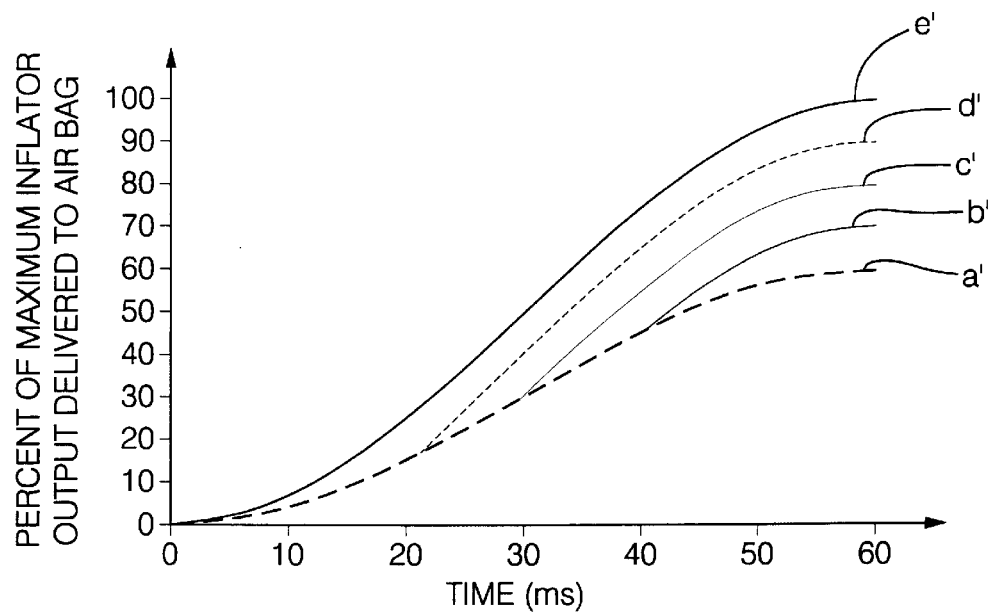
FIG. 12 is an exemplary graph depicting percent of maximum inflator output delivered to the air bag versus time for the case in which the vent opening is normally open.

This can be further understood with reference to FIG. 12. FIG. 12 shows the generic inflation curves for a module having about 40% maximum venting. However, the general shape of the curves will be the same for any amount of maximum venting. The curves represent the percent of maximum inflator output delivered to the air bag versus time that the inflator actually discharges gas in milliseconds for a generic module in which the vent openings 21 are normally open when the movable member 50 is in the first position.

For example, curve a' represents when the movable member 50 remains in the first position during the entire inflator activation. Curve a' shows that when the vent openings 21 are never closed, only 60% of the inflator gas output is delivered to the air bag 27 for inflation and 40% or the maximum amount is expelled out through the vent openings 21 in the housing 20. At the other end of the range, curve e' shows the situation in which the movable member 50 is moved to the second position during the entire inflator activation. Curve e' shows that when the vent openings 21 are closed at 0 ms or approximately at the same moment that the inflator 30 is activated, then 100% of inflator output is delivered to the air bag 27. It will be appreciated that the 40% maximum venting was a predetermined amount based on the size and location of the vent openings 21 and can be varied. Curve d' depicts that when the movable member 50 is moved to the second position at the predetermined time of 20 ms into inflator 30 activation, then about 90% of the inflator gas output is delivered into the air bag 27 and 10% of the inflator gas is expelled out through the vent openings 21. Curve c' represents the scenario in which the movable member 50 is moved to the second position at the predetermined time of 30 ms into inflator 30 activation such that about 80% of the inflator gas output is delivered into the air bag 27 and 20% of the inflator gas is expelled out through the vent openings 21. Finally, curve b' represents the scenario in which the movable member 50 is moved to the second position at the predetermined time of 40 ms into inflator 30 activation such that about 70% of the inflator gas output is delivered into the air bag 27 and about 30% of the inflator gas is expelled out through the vent openings 21. It will be appreciated that the curves are merely exemplary and that many other inflation variations are possible depending on the maximum amount of venting and the time at which the device 80 is fired to move the movable member 50. It will be appreciated that the venting could be varied from 0% to 100% with the appropriate number of vent openings 21.

Thus, it will be appreciated that variable levels of inflation of the air bag 27 can be achieved using a single inflator 30 having only a single level of gas output in combination with vent openings 21 that are preferably entirely open or entirely closed at a predetermined time during discharge of inflator gas by a movable member 50 in response to activation of a pyrotechnic device 80.

Figure 13:
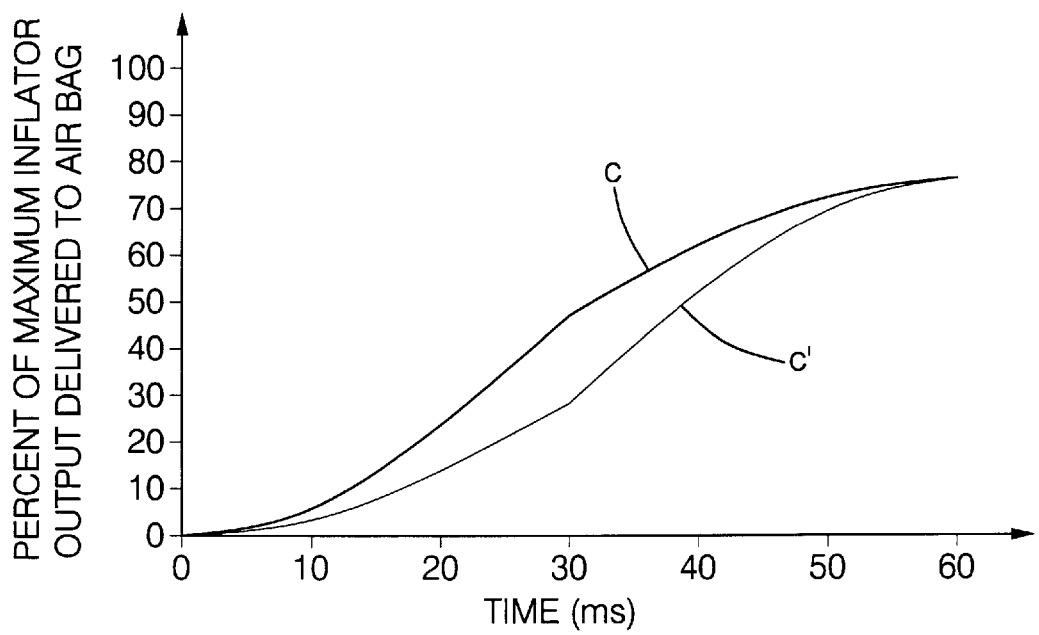
FIG. 13 is an exemplary graph comparing percent of maximum inflator output delivered to the air bag versus time for the cases in which the vent openings are normally open or normally closed at the same predetermined time of movement of the movable member.

FIG. 13 shows a comparison of the shape of the inflation curve for the situation when the vent openings 21 are either initially normally closed, curve c, or normally opened, curve c'. In both cases, the movable member 50 is moved to the second position at the predetermined time of 30 ms into inflator 30 activation such that about 80% of the inflator gas output is delivered into the air bag 27 and about 20% of the inflator gas is expelled out through the vent openings 21. However, the shape of the inflation curve depends on whether the vent openings 21 are normally open or normally closed. In the situation when the movable member 50 normally opens the vent openings 21 in the first position, the inflation curve c' has a gentler initial slope than the curve c in which the vent openings 21 were initially closed. Advantageously, this is yet another way in which the inflation of the air bag 27 can be controlled using the movable member 50 and device 80. It will be appreciated that if a gentler initial slope is desired for lesser initial air bag inflation, then the vent openings 21 can be normally opened in the first position and then closed in the second position upon activation of the device 80. Alternately, if a sharper initial slope is desired for greater initial air bag inflation, then the vent openings 21 can be normally closed in the first position and then opened in the second position upon activation of the device 80.

Figure 3:
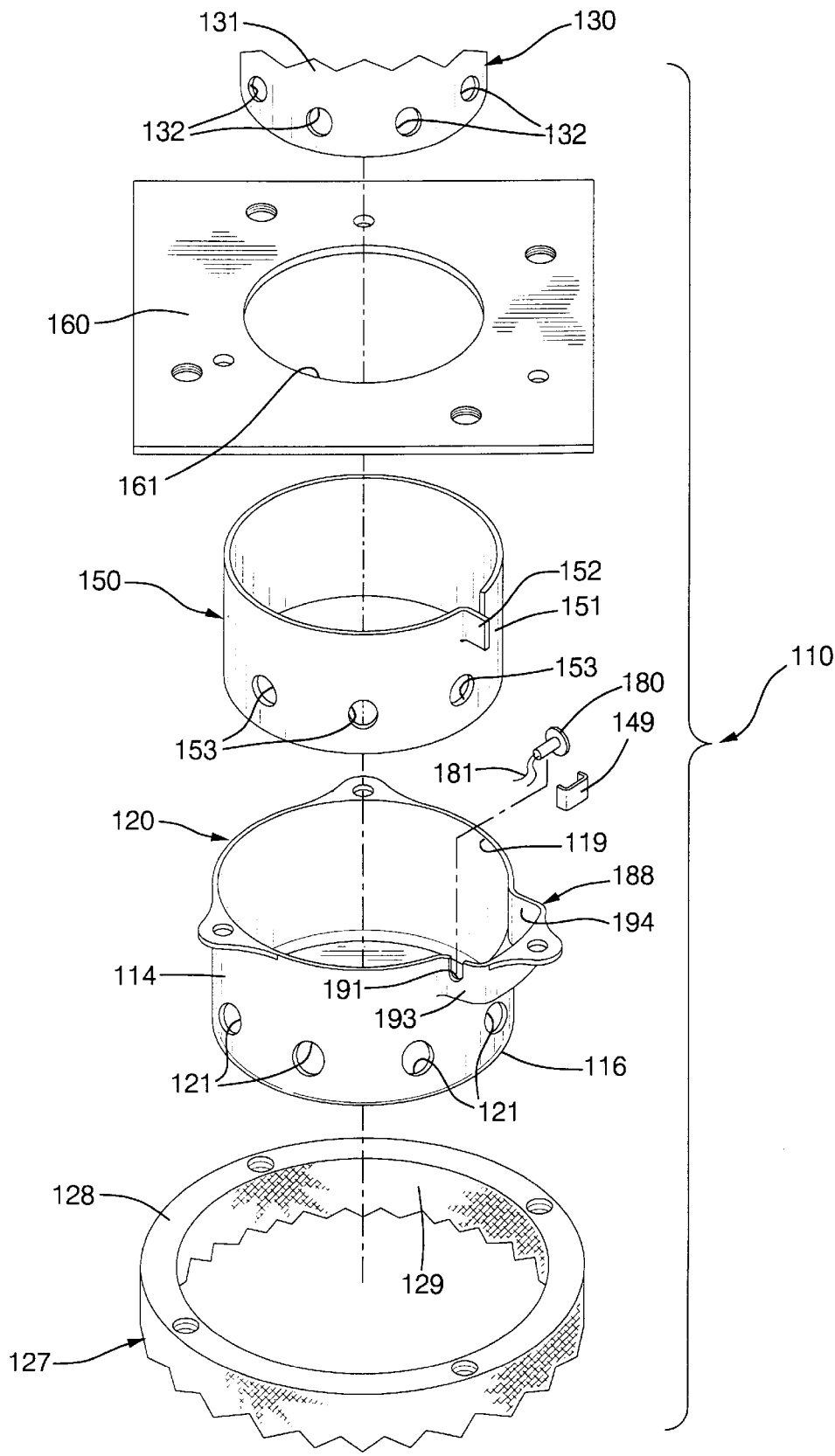
FIG. 3 is an exploded perspective view showing an alternate embodiment for a driver's side air bag module and including a movable member being a rotatable ring and with the vent openings initially closed.
Figure 4:
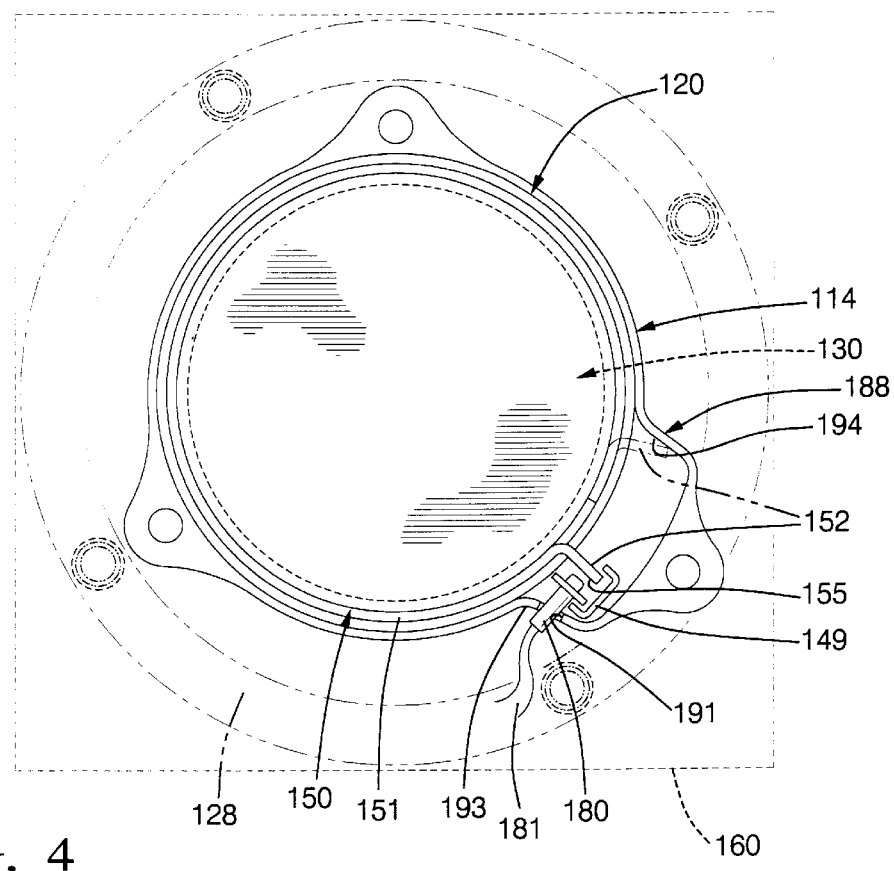
FIG. 4 is a plan view of the module of FIG. 3 with a base plate in phantom lines and showing a tab of the movable member in a first position in solid lines and in a second position in phantom lines.

FIGS. 3 and 4 show an alternate embodiment of the invention having a movable member 150 which is a rotatable ring. This version is particularly well-adapted for use on the driver's side of a vehicle. Similar features will be denoted with similar numerals increased by 100. An air bag module 110 is mounted in a vehicle steering wheel (not shown) for protection of a vehicle occupant (not shown). The module 110 includes a housing 120, an inflatable air bag 127, and an inflator 130 for generating gas to inflate the air bag 127. The module 110 is typically mounted on the driver's side of the vehicle, but could also be mounted in other locations on the vehicle. The module 110 is secured to the vehicle in any suitable manner, such as by a base plate 160. The module 110 further includes a movable member 150 being a rotatable ring and a pyrotechnic device 180 used to vary the amount of inflator gas discharged into the air bag 127, as described in detail hereinafter.

The housing 120 includes a generally circular side wall 114 closed by a bottom wall 116. The side wall 114 defines a housing opening 119 through which gas is discharged to inflate the air bag 127. The side wall 114 of the housing 120 is positioned adjacent the discharge ports 132 of the inflator 130. The housing 120 further includes a plurality of vent openings 121 in the side wall 114. The vent openings 121 are preferably generally aligned with respective discharge ports 132 in the inflator 130 such that discharging gas from the inflator is expelled directly out through the vent openings 121 when they are open.

As shown in FIG. 3, the module 110 includes a generally flat base plate 160 to which the air bag 127, inflator 130, and housing 120 are attached. The base plate 160 includes a base plate opening 161 for receiving the inflator 130 partially therethrough during assembly. The base plate 160 is preferably connected to the vehicle such as by fasteners (not shown) to connect the module 110 to the vehicle.

As best shown in FIG. 3, the inflator 130 may be of any conventional construction for generating inflator gas to inflate the air bag 127. Advantageously, the inflator 130 is preferably a single stage inflator 130 which outputs inflator gas at a single level for inflating the air bag 127. The inflator 130 has a generally circular body portion 131 and is insertable through the base plate opening 161 for insertion within the housing 120. The inflator 130 may include a flange (not shown) for connection to the base plate 160. The inflator 130 also includes a plurality of discharge ports 132 which are preferably positioned adjacent the side walls 114 of the housing 120 and are spaced around the body portion 131 for thrust neutral discharge. Preferably, certain of the discharge ports 132 are generally aligned with the corresponding vent openings 121 in the housing 120.

The air bag 127 may be of any conventional construction for inflating upon the discharge of inflator gas. Referring to FIG. 3, the air bag 127 is stored atop the inflator 130 prior to inflator activation. The air bag 127 includes an air bag retainer 128 located around a mouth portion 129 of the air bag 127. The air bag retainer 128 connects the air bag 127 to the base plate 160. Upon activation of the inflator 130, the air bag 127 is filled with a predetermined amount of inflator gas during inflator activation and deploys out through a cover (not shown) on the steering wheel for protection of the vehicle occupant.

Referring to FIGS. 3 and 4, the housing 120 includes a radially outwardly projecting support member 188 including a wall portion 193 having a support aperture 191 for holding the pyrotechnic device 180 therein. The support member 188 includes stop surface 194 against which the movable member 150 is stopped during rotation and positioned relative to the vent openings 121 upon firing of the pyrotechnic device 180. The support member 188 may be attached to, such as by welding, or integrally formed with the housing 120.

The movable member 150 is slidably mounted between the housing 120 and the inflator 130. The movable member 150 is captured during assembly between the housing 120 and the base plate 160. The movable member 150 is preferably shaped like a ring and is alignable with the vent openings 121 by rotational movement. The movable member 150 is movable relative to the vent openings 121 for opening and closing the vent openings 121 at a predetermined time to control the amount of inflator gas discharged into the air bag 127 and the amount of inflator gas expelled out through the vent openings 121 of the housing 120. The movable member 150 includes a generally circular wall portion 151 and a radially outwardly projecting tab portion 152 which is bent at approximately 90 degrees relative to the wall portion 151. As best shown in FIG. 4, the tab portion 152 includes a reaction surface 155 facing the pyrotechnic device 180. The wall portion 151 includes a plurality of apertures 153 which are alignable with the vent openings 121.

A clip 149 extends between the device 180 and the tab portion 152 and holds the movable member 150 in an initial first position. It will be appreciated that in the first position, the apertures 153 in the movable member 150 are preferably not aligned with the vent openings 121 on the housing 120 such that the vent openings 121 are preferably entirely closed prior to activation of the inflator 130. Upon activation of the pyrotechnic device 180, the movable member 150 is rotated to a second position in which the apertures 153 on the movable member 150 are aligned with the vent openings 121 on the housing 120. Thus, when the movable member 150 is in the second position, the vent openings 121 are entirely open.

The pyrotechnic device 180 or squib preferably contains a chemical which is ignited upon receiving a signal from vehicle sensors (not shown). A wire 181 transmits a signal from the sensors to the pyrotechnic device 180 to activate the device 180. Upon activation, the device 180 produces a pressure wave that presses against the reaction surface 155 of the movable member 150 and quickly forces the movable member 150 from the first position to the second position. Advantageously, the pyrotechnic device 180 produces a pressure wave almost instantaneously and preferably within less than 1 ms after activation. Thus, upon firing of the pyrotechnic device 180 the movable member 150 is rotated from the first position in which the vent openings 121 are entirely closed to the second position in which the vent openings 121 are entirely open almost instantaneously.

Upon sensing certain predetermined vehicle and occupant conditions, the sensors send a signal to the pyrotechnic device 180 advising the device 180 whether the movable member 150 should be moved at a predetermined time during activation of the inflator 130 so that a certain amount of inflator gas is expelled out through the vent openings 121. Referring to FIG. 4, if the device 180 is fired, the pressure wave or flame expelled by the device 180 reacts against the reaction surface 155 of the tab portion 152 of the movable member 150 and instantaneously rotates the movable member 150 into the second position. The force of the movable member 150 breaks off the clip 149 and is nearly instantaneously shifted from the first position to the second position. The tab portion 152 engages the stop surface 194 which limits rotational movement of the movable member 150 upon activation of the device 180. When the movable member 150 is moved to the second position, the apertures 153 are aligned with the vent openings 121 such that the vent openings 121 are entirely open and inflator gas is expelled out through the vent openings 121.

As described in detail above with respect to FIGS. 1, 2, 5, 6 and 11–13, the amount of inflator gas discharged into the air bag 127 is easily varied by moving the movable member 150 at a specific predetermined time as enabled by the firing of the device 180. It will be appreciated that variable levels of inflation of the air bag 127 can be achieved using a single inflator 130 having only a single level of gas output in combination with vent openings 121 that are preferably entirely opened or entirely closed at a predetermined time during discharge of inflator gas by the movable member 150 in response to activation of a pyrotechnic device 180. The predetermined time for moving the movable member 150 is determined in response to predetermined conditions of the occupant and vehicle which are sensed by one or more sensors and relayed to the device 180.

It will be understood that a person skilled in the art may make modifications to the preferred embodiment shown herein within the scope and spirit of the claims. Although the movable member 150 being a rotatable ring is shown as being a continuous circle, it will be appreciated that the ring could be discontinuous and need not male a complete circle. Although only one movable member 150, one set of vent openings 121, and one device 180 are shown it will be appreciated that there could be additional devices 180, vent openings 121 and movable members 150 on a given module 110. It will further be appreciated that there need only be at least one vent opening 121 on the housing 120 and that the movable member 150 need not necessarily include apertures 153 since the movable member 150 can simply be moved relative to the vent opening 121 for opening and closing the vent opening 121.

Although the embodiment shows the movable member 150 closing the vent openings 121 in the first position prior to inflator activation and opening the vent openings 121 at a predetermined time when moved to the second position upon activation of the device 180, it will be appreciated that the movable member 150 may alternately open the vent openings 121 in the first position prior to inflator activation and close the vent openings 121 at a predetermined time during inflator activation when moved to the second position.

Another alternate embodiment of the invention will now be described with reference to FIG. 7. The embodiment of FIG. 7 will be described using similar references numerals increased by 200. In brief, the embodiment of FIG. 7 differs from the above embodiments in that the movable member 250 is positioned inside of the housing 220 and the vent opening 221 is initially opened.

Figure 7:
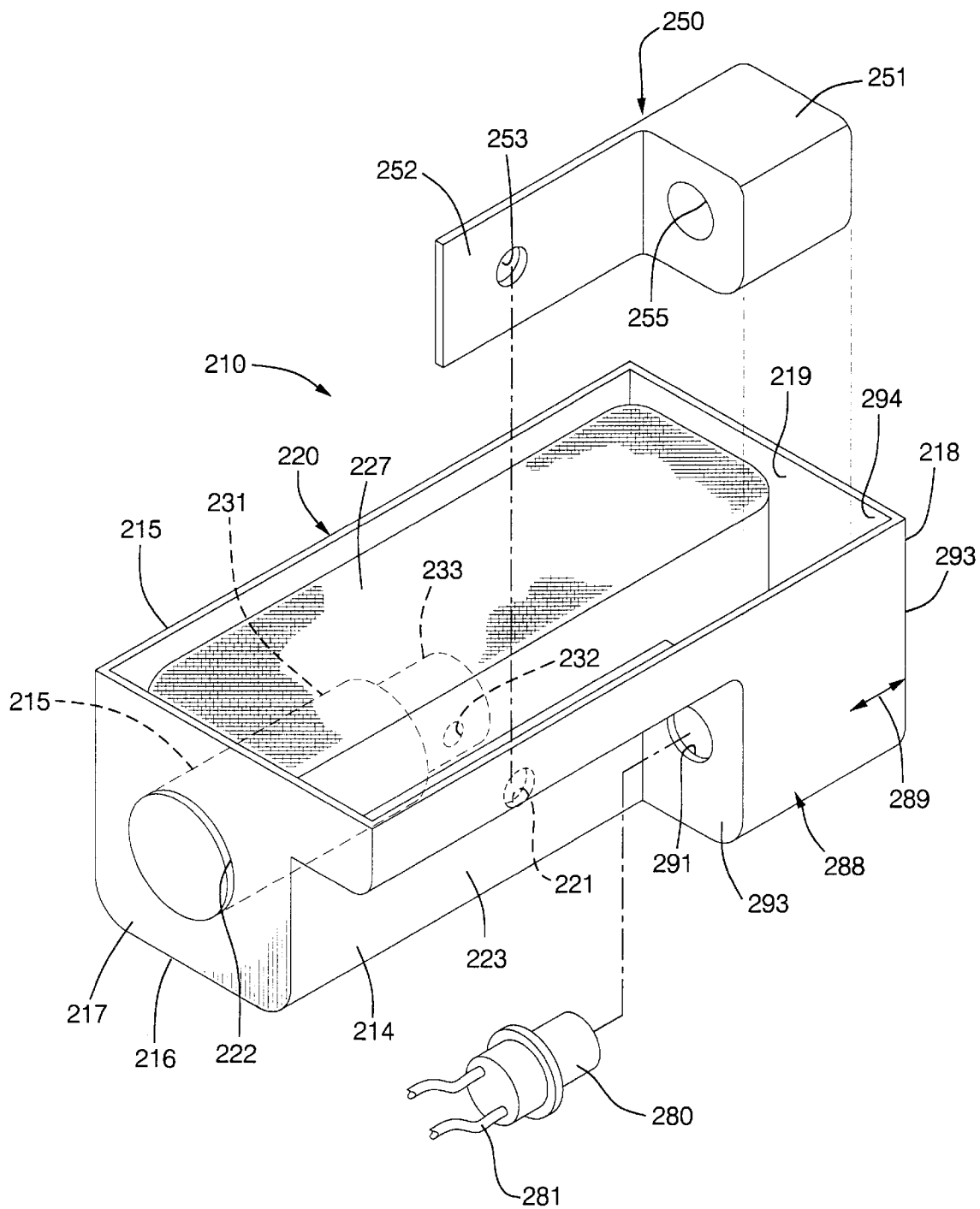
FIG. 7 is an exploded perspective view of another alternate embodiment of the invention showing a passenger side air bag module with a housing having a pocket portion and a movable member which moves in a longitudinal direction and a vent opening in the housing which is initially open.

Referring to FIG. 7, an air bag module 210 is mounted in a vehicle (not shown) for protection of a vehicle occupant (not shown). The module 210 includes a housing 220, an inflatable air bag 227, and an inflator 230 for generating gas to inflate the air bag 227. The module 210 is typically mounted on the passenger side of the vehicle, but could also be mounted in other locations on the vehicle. The module 210 is secured to the vehicle in any suitable manner. The module 210 further includes a movable member 250 and a pyrotechnic device 280 used to vary the amount of inflator gas discharged into the air bag 227, as described in detail hereinafter.

The housing 220 includes opposing sides walls 214, 215 joined by a bottom wall 216 and opposing end walls 217, 218. The end wall 217 includes an end opening 222 for receiving the inflator 230 therein. The side walls 214, 215 and end walls 217, 218 cooperatively define a housing opening 219 through which the air bag 227 is deployed. The side wall 214 of the housing 220 includes an indented portion 223 positioned adjacent the discharge ports 232 of the inflator 230. The housing 220 further includes a single vent opening 221 in the side wall 214. The vent opening 221 is located on the indented portion 223 of the side wall 214 and is preferably directly aligned with corresponding discharge port 232 in the inflator 230 such that substantially all of the gas discharged from the aligned discharge port 232 is expelled out through the vent opening 221 when open.

The inflator 230 may be of any conventional construction for generating inflator gas to inflate the air bag 227. Advantageously, the inflator 230 is preferably a single stage inflator 230 which outputs inflator gas at a single level for inflating the air bag 227. The inflator 230 has a generally cylindrical body portion 231 and is insertable through the end opening 222 in the end wall 217 for insertion within the housing 220. The inflator 230 has ends which are suitably secured to the housing 220. The inflator 230 also includes an end portion 233 having three discharge ports 232 spaced evenly apart around the end portion 233 for thrust neutral discharge. Preferably, one of the discharge ports 232, which can be seen in FIG. 7, is directly aligned with the corresponding vent opening 221 in the housing 220. Thus, it will be appreciated that in this embodiment, the maximum amount of venting of the module 210 is about 33% since one-third of the maximum amount of gas will be expelled out through the vent opening 221 if the vent opening 221 remains open during the entire time of inflator activation and is never closed by the movable member 250.

The air bag 227 may be of any conventional construction for inflating upon the discharge of inflator gas. The air bag 227 is shown in the folded condition stored atop the inflator 230 prior to inflator activation. Upon activation of the inflator 230, the air bag 227 is filled with a predetermined amount of inflator gas during inflator activation and deploys out through the housing opening 219 for protection of the vehicle occupant.

The housing 220 includes an outwardly projecting pocket portion 288 disposed on the side wall 214 for holding the movable member 250 and the pyrotechnic device 280 therein. The pocket portion 288 is preferably integrally formed with the housing 220. The pocket portion 288 has a length which is greater than a length of a reaction portion 251 of the movable member 250. Thus, opposing wall portions 293 of the pocket portion 288 are spaced apart such that there is a gap 289 created between the movable member 250 and one of the wall portions 293 when the reaction portion 251 of the movable member 250 is seated into the pocket portion 288. This enables the movable member 250 to be moved from a first position to a second position, as described further hereinafter. The pocket portion 288 includes a stop surface 294 on one wall portion 293 against which the movable member 250 is stopped and positioned relative to the vent openings 221 upon firing of the pyrotechnic device 280. The opposing wall portion 293 of the pocket portion 288 includes a support aperture 291 through which the pyrotechnic device 280 is inserted and held in position relative the movable member 250. It will be appreciated that the movable member 250 could be moved in the opposite direction with the stop surface 294, device 280 and support aperture 291 located on the opposite wall portions 293.

The movable member 250 is seated in the pocket portion 288 and is slidable within the pocket portion 288 when the device 280 is fired. The movable member 250 is movable relative to the vent opening 221 for opening and closing the vent opening 221 at a predetermined time to control the amount of inflator gas discharged into the air bag 227 and the amount of inflator gas expelled out through the vent opening 221 of the housing 220. The movable member 250 has a generally planar outwardly extending portion 252 positioned adjacent the vent opening 221 and an enlarged reaction portion 251. As shown in FIG. 7, the reaction portion 251 includes a reaction surface 255 facing the pyrotechnic device 280. The outwardly extending portion 252 includes an aperture 253 which is normally aligned with the vent opening 221 for opening the vent opening 221.

The pyrotechnic device 280 or squib preferably contains a chemical which is ignited upon receiving a signal from vehicle sensors (not shown). A wire 281 transmits a signal from the sensors to the pyrotechnic device 280 to activate the device 280. Prior to activation, the device 280 acts as a pin that holds the movable member 250 in a first initial position within the pocket portion 288. Upon activation, the device 280 produces a pressure wave that presses against the reaction surface 255 of the movable member 250 and quickly forces the movable member 250 from a first position in which there is a gap 289 between the movable member 250 and the stop surface 294 into a second position in which the movable member 250 engages the stop surface 294. It will be appreciated that in the first position, the aperture 253 in the movable member 250 is aligned with the vent opening 221 on the housing 220 such that the vent opening 221 is preferably entirely open. Upon activation of the pyrotechnic device 280, the movable member 250 is movable to the second position in which the aperture 253 on the movable member 250 is not aligned with the vent opening 221 on the housing 220. Thus, when the movable member 250 is in the second position, the vent opening 221 is entirely closed. It will be appreciated that the gap 289 is sized such that the movable member 250 can move a sufficient amount to close the vent opening 221. Advantageously, the pyrotechnic device 280 produces a pressure wave almost instantaneously and preferably within less than 1 ms after activation such that the exact timing of the venting can be controlled to enable control of the amount of inflator gas delivered to the air bag 227.

It will be appreciated that similar to the other embodiments, the amount of inflator gas discharged into the air bag 227 is variable to an almost unlimited range of levels, even with the use of the single stage inflator 230. Upon the sensing of predetermined vehicle conditions by sensors (not shown), the inflator 230 is activated and receives the signal to begin the process of discharging inflator gas at a time designated as 0 milliseconds. Advantageously, the use of a pyrotechnic device 280 enables the movable member 250 to be moved and the vent opening 221 to be changed from open to closed almost instantaneously upon firing of the device 280. Thus, the amount of inflator gas discharged into the air bag 227 is easily varied by moving the movable member 250 at different predetermined times during inflator activation.

The predetermined time for moving the movable member 250 is determined in response to predetermined conditions of the occupant and vehicle which are sensed by one or more sensors and relayed to the device. If the device 280 is never fired and the movable member 250 remains in the first position, the discharge port 232 remains aligned with the vent opening 221 and aperture 253 and expels all of its gas directly out through the vent opening 221 such that a maximum of about one-third of the inflator gas may be vented and the other two-thirds is delivered into the air bag 227. Alternately, if the device 280 is fired at the same time as inflator activation (time=0 ms), the movable member 250 is moved to the second position and the vent opening 221 is closed and the full amount of inflator gas is delivered to the air bag 227. It will further be appreciated that the device 280 could be fired to move the movable member 250 at a variety of times during inflator gas discharge so that more than two-thirds but less than 100% of the gas is delivered to the air bag 227.

Most preferably, the vent opening 221 is directly aligned with the corresponding discharge port 232 on the inflator 230 such that substantially all of the inflator gas discharged from the corresponding discharge port 332 is expelled out through the corresponding aligned vent opening 221. Advantageously, this allows the maximum amount of venting to be achieved with the smallest and least amount of vent openings possible.

Thus, it will be appreciated that variable levels of inflation of the air bag 227 can be achieved using a single inflator 230 having only a single level of gas output in combination with a single vent opening 221 that is preferably entirely opened or entirely closed at a predetermined time during discharge of inflator gas by a movable member 250 in response to activation of a pyrotechnic device 280. Almost instantaneous control of the movable member 250 is enabled by the use of the device 280 that reacts nearly instantaneously to the signal received from the vehicle sensors. It will also be appreciated that this system provides a relatively simple, cost effective and lightweight solution to providing variable levels of air bag 227 inflation from a single level inflator 230.

It will be understood that a person skilled in the art may make modifications to the preferred embodiment shown herein within the scope and spirit of the claims. For example, although the inflator 230 is preferably a single stage inflator, it is not limited to use with a single stage inflator. Although only one movable member 250, one vent opening 221, and one device 280 is shown it will be appreciated that there could be additional devices 280, vent openings 221 and movable members 250 on a given module 110. It will further be appreciated that the movable member 250 need not necessarily include apertures 253 since the movable member 250 can simply be moved relative to the vent opening 221 for opening and closing the vent opening 221.

Although the embodiment shows the movable member 250 opening the vent opening 221 in the first position prior to inflator activation and closing the vent opening 221 at a predetermined time when moved to the second position upon activation of the device 280, it will be appreciated that the movable member 250 may alternately close the vent opening 221 in the first position prior to inflator activation and open the vent opening 221 at a predetermined time during inflator activation when moved to the second position upon firing of the device 280.

Yet another alternate embodiment of the invention will now be described with reference to FIGS. 8–10. In brief, the embodiment of FIGS. 8–10 is similar to the embodiment of FIG. 7, but adapted for a typical driver's side style of module 310. Referring to FIG. 8, an air bag module 310 is mounted in a vehicle (not shown) for protection of a vehicle occupant (not shown). The module 310 includes a housing 320, an inflatable air bag (not shown), and an inflator 330 for generating gas to inflate the air bag. The module 310 is typically mounted on the driver's side of the vehicle, but could also be mounted in other locations on the vehicle. The module 310 is secured to the vehicle in any suitable manner. The module 310 further includes a movable member 350 and a pyrotechnic device 380 used to vary the amount of inflator gas discharged into the air bag, as described in detail hereinafter.

The housing 320 includes a generally circular side wall 314 closed by a bottom wall 316. The side wall 314 defines a housing opening 319 through which inflator gas is discharged into the air bag. The side wall 314 of the housing 320 is positioned adjacent the discharge ports 332 of the inflator 330. The housing 320 further includes a single vent opening 321 in the side wall 314. The vent opening 321 is preferably directly aligned with a corresponding discharge port 332 in the inflator 330 such that substantially all of the gas discharged from the discharge port 332 is expelled out through the vent opening 321 when open.

The inflator 330 may be of any conventional construction for generating inflator gas to inflate the air bag. Advantageously, the inflator 330 is preferably a single stage inflator 330 which outputs inflator gas at a single level for inflating the air bag. The inflator 330 has a generally cylindrical body portion 331 and is insertable through the housing opening 319 into the housing 320. The inflator 330 includes a radially outwardly projecting inflator flange 334 which is suitably secured to the housing 320. The inflator 330 also preferably includes three discharge ports 332 spaced evenly apart around the body portion 331 for thrust neutral discharge. Preferably, one of the discharge ports 332 is directly aligned with the vent opening 321 in the housing 320. Thus, it will be appreciated that in this embodiment, the maximum amount of venting of the module 310 is about 33% since about one-third of the maximum amount of gas will be expelled out through the vent opening 321 if the vent opening 321 remains open during the entire time of inflator activation and is never closed by the movable member 350.

The module 310 may include a base plate to which the air bag, inflator flange 334, and housing 320 are attached. The air bag may be of any conventional construction for inflating upon the discharge of inflator gas. The air bag preferably has a mouth portion that is joined to the base plate and receives inflator gas delivered through the housing opening 319. Upon activation of the inflator 330, the air bag is filled with a predetermined amount of inflator gas during inflator activation and deploys out through a cover (not shown) in a steering wheel (not shown) for protection of the vehicle occupant.

The housing 320 includes an outwardly projecting pocket portion 388 preferably extending downwardly from the bottom wall 316 for holding the movable member 350 and the pyrotechnic device 380 therein. The pocket portion 388 is preferably integrally formed with the housing 320. The pocket portion 388 has a height which is greater than a height of a reaction portion 351 of the movable member 350. Thus as shown in FIG. 9, a gap 389 is created between the movable member 350 and the upper end of the pocket portion 388 when the reaction portion 351 of the movable member 350 is seated in the pocket portion 388. This enables the movable member 350 to be moved from a first position to a second position, as described further hereinafter.

A bottom wall portion 393 of the pocket portion 388 includes a support aperture 391 through which the pyrotechnic device 380 is inserted and held in position relative the movable member 350. The housing 320 includes a stop surface 394 against which the movable member 350 is stopped and positioned relative to the vent opening 321 upon firing of the pyrotechnic device 380. The stop surface 394 may be provided as a support plate 396 which is inserted in the housing 320 after the movable member 350 and prior to the inflator 330.

The movable member 350 is seated in the pocket portion 388 and is slidable within the pocket portion 388 when the device 380 is fired. The movable member 350 is movable relative to the vent opening 321 for opening and closing the vent opening 321 at a predetermined time to control the amount of inflator gas discharged into the air bag and the amount of inflator gas expelled out through the vent opening 321 of the housing 320. The movable member 350 has a generally planar upwardly extending portion 352 positioned adjacent the vent opening 321 and an enlarged reaction portion 35 1. As best shown in FIGS. 9 and 10, the reaction portion 351 includes a reaction surface 355 facing the pyrotechnic device 380. The outwardly extending portion 352 includes an aperture 353 which is normally aligned with the vent opening 321 for opening the vent opening 321.

The pyrotechnic device 380 or squib preferably contains a chemical which is ignited upon receiving a signal from vehicle sensors (not shown). A wire 381 transmits a signal from the sensors to the pyrotechnic device 380 to activate the device 380. Prior to activation, the device 380 acts as a pin that holds the movable member 350 in a first initial position within pocket portion 388 as shown in FIG. 9. Upon activation as shown in FIG. 10, the device 380 produces a pressure wave or flame that presses against the reaction surface 355 of the movable member 350 and quickly forces the movable member 350 from a first position in which there is a gap 389 between the reaction portion 351 and the stop surface 394 into a second position in which the reaction portion 351 engages the stop surface 394. The movable member 350 preferably includes a snap-locking feature 335 which snaps over the support plate 396 and holds up the movable member 350 in the second position. As shown in FIG. 9, it will be appreciated that in the first position, the aperture 353 in the movable member 350 is aligned with the vent opening 321 on the housing 320 such that the vent opening 321 is preferably entirely open prior to activation of the inflator 330. Upon activation of the pyrotechnic device 380 as shown in FIG. 10, the movable member 350 is shot upwardly to the second position in which the aperture 353 on the movable member 350 is aligned with the vent opening 321 on the housing 320. Thus, when the movable member 350 is in the second position, the vent opening 321 is entirely closed. It will be appreciated that the gap 389 is sized such that the movable member 350 can move a sufficient amount to close the vent opening 321. Advantageously, the pyrotechnic device 380 produces a pressure wave almost instantaneously and preferably within less than 1 ms after activation such that the exact timing of the venting can be controlled to enable control of the amount of inflator gas delivered to the air bag.

It will be appreciated that similar to the other embodiments, the amount of inflator gas discharged into the air bag is variable to a wide range of levels, even with the use of the single stage inflator 330. Upon the sensing of predetermined vehicle conditions by sensors (not shown), the inflator 330 is activated and receives the signal to begin the process of discharging inflator gas. Advantageously, the use of a pyrotechnic device 380 enables the movable member 350 to be moved and the vent opening 321 to be changed from open to closed almost instantaneously upon firing of the device 380. Thus, the amount of inflator gas discharged into the air bag is easily varied by moving the movable member 350 at different predetermined times during inflator activation.

The predetermined time for moving the movable member 350 is determined in response to predetermined conditions of the occupant and vehicle which are sensed by one or more sensors and relayed to the device 380. If the device 380 is never fired and the movable member 350 remains in the first position, the discharge port 332 remains aligned with the vent opening 321 and the aperture 353 and expels all of its gas directly out through the vent opening 321 such that a maximum of about one-third of the inflator gas may be vented and the other two-thirds is delivered into the air bag. Alternately, if the device 380 is fired at the same time as inflator activation, the movable member 350 is moved to the second position and the vent opening 321 is closed and the full amount of inflator gas is delivered to the air bag. It will further be appreciated that the device 380 could be fired and move the movable member 350 at a variety of times during inflator gas discharge so that more than two-thirds but less than 100% of the gas is delivered to the air bag.

Most preferably, the vent opening 321 is directly aligned with the corresponding discharge port 332 on the inflator 330 such that substantially all of the inflator gas discharged from the discharge port 332 is expelled out through the corresponding aligned vent opening 321. Advantageously, this allows the maximum amount of venting to be achieved with the smallest and least amount of vent openings possible.

Thus, it will be appreciated that variable levels of inflation of the air bag can be achieved using a single inflator 330 having only a single level of gas output in combination with a single vent opening 321 that is preferably entirely opened or entirely closed at a predetermined time during discharge of inflator gas by a movable member 350 in response to activation of a pyrotechnic device 380. Almost instantaneous control of the movable member 350 is enabled by the use of the device 380 that reacts nearly instantaneously to the signal received from the vehicle sensors. It will also be appreciated that this system provides a relatively simple, cost effective and lightweight solution to providing variable levels of air bag inflation from a single level inflator 330.

It will be understood that a person skilled in the art may make modifications to the preferred embodiment shown herein within the scope and spirit of the claims. For example, although the inflator 330 is preferably a single stage inflator, it is not limited to use with a single stage inflator. Although only one movable member 350, one vent opening 321, and one device 380 is shown it will be appreciated that there could be additional devices 380, vent openings 321 and movable members 350 on a given module 310. It will further be appreciated that the movable member 350 need not necessarily include aperture 353 since the movable member 350 can simply be moved relative to the vent opening 321 for opening and closing the vent opening 321.

Although the embodiment shows the movable member 350 opening the vent opening 321 in the first position prior to inflator activation and closing the vent opening 321 at a predetermined time when moved to the second position upon activation of the device 380, it will be appreciated that the movable member 350 may alternately close the vent opening 321 in the first position prior to inflator activation and open the vent opening 321 at a predetermined time during inflator activation when moved to the second position upon firing of the device 380.

While the present invention has been described as carried out in specific embodiments hereof, it is not intended to be limited thereby but is intended to cover the invention broadly within the scope and spirit of the appended claims.

We claim:

1. An air bag module for restraint of an occupant in a vehicle, the air bag module comprising:

an air bag;

an inflator being activatable to discharge inflator gas for inflating the air bag, the inflator having a predetermined number of discharge ports through which inflator gas is discharged and through which the level of inflation gas into the air bag can be varied;

a housing having a wall adjacent the discharge port of the inflator, the housing including a predetermined number of vent openings equal to the number of discharge ports through which the level of inflation gas into the air bag can be varied;

a movable member alignable with the vent openings, the movable member being movable relative to the vent openings for opening and closing the vent openings at a predetermined time during inflator activation to control the amount of inflator gas discharged into the air bag and the amount of inflator gas expelled out through the vent openings of the housing; and a device being activatable during activation of the inflator to move the movable member relative to the vent openings at the predetermined time during inflator activation;

the vent openings on the housing and the discharge ports on the inflator being directly aligned with each other such that substantially all of the inflator gas discharged from the predetermined number of discharge ports through which the level of inflation gas into the air bag can be varied is expelled out through the vent openings when the movable member is positioned for opening the vent openings.

2. The air bag module of claim 1 wherein the vent openings are substantially sized and shaped to match the discharge ports on the inflator.

\* \* \* \* \*